United States Patent
Boissin et al.

(10) Patent No.: US 6,314,957 B1
(45) Date of Patent: Nov. 13, 2001

(54) PORTABLE HOME OXYGEN THERAPY MEDICAL EQUIPMENT

(75) Inventors: Jean-Claude Boissin, Saint-Ismier; Vincent Hennebel, Sevres, both of (FR)

(73) Assignee: Air Liquide Sante (International), Paris Cedex (FR)

( * ) Notice: Subject to any disclaimer, the term of this patent is extended or adjusted under 35 U.S.C. 154(b) by 0 days.

(21) Appl. No.: 09/292,827

(22) Filed: Apr. 16, 1999

(30) Foreign Application Priority Data

Apr. 13, 1999 (FR) .................................................. 99 04585

(51) Int. Cl.[7] .................................................. A61M 16/00
(52) U.S. Cl. .................................. 128/204.17; 128/205.11
(58) Field of Search ........................... 28/200.24, 203.25, 28/203.26, 204.17, 204.18, 205.11, 207.14

(56) References Cited

U.S. PATENT DOCUMENTS

| | | | |
|---|---|---|---|
| 4,198,213 | * | 4/1980 | Mannatt ........................... 128/205.12 |
| 5,144,945 | * | 9/1992 | Nishino et al. ................. 128/205.12 |
| 5,158,584 | | 10/1992 | Tamura . |
| 5,827,358 | | 10/1998 | Kulish et al. . |
| 5,858,062 | | 1/1999 | McCulloh et al. . |
| 5,979,440 | | 11/1999 | Honkonen et al. . |
| 5,988,165 | * | 11/1989 | Richey et al. ................... 128/205.12 |
| 5,988,165 | * | 11/1999 | Richey et al. ................... 128/205.12 |
| 2002[0]012121 | * | 5/1989 | McCombs ........................ 128/204.18 |
| 2004[0]012121 | * | 12/1985 | Rowland ......................... 128/205.12 |
| 2004[0]012121 | * | 12/1999 | Rowland ......................... 128/205.12 |

FOREIGN PATENT DOCUMENTS

| | | | |
|---|---|---|---|
| WO 99/11989 | * | 3/2001 | (DE) ................................ 128/205.12 |
| 2003[0]0112000* | | 3/1998 | (JP) ................................. 128/205.12 |
| 2003[0]0112000* | | 3/2001 | (JP) ................................. 128/205.12 |
| WO 99/11989 | | 3/1999 | (WO) .............................. 128/205.12 |
| WO 99/11989 | * | 3/2000 | (WO) .............................. 128/205.12 |

* cited by examiner

Primary Examiner—Glenn K. Dawson
(74) Attorney, Agent, or Firm—Young & Thompson

(57) ABSTRACT

A portable apparatus for domiciliary and ambulatory oxygen therapy intended for people suffering from respiratory insufficiencies and treated by administering gaseous oxygen so as to correct the gas contents in their blood, in particular the carbon dioxide and oxygen contents. The system includes an air compression device; a concentrator device allowing gaseous oxygen having a purity of 50 to 99% to be produced; an oxygen liquefaction device; an accumulation and storage device for the oxygen liquefied by the liquefaction device; a liquefied-oxygen warming and vaporizing device; and a gas transport section for conveying the oxygen warmed and vaporized by the warming/vaporizing device to a gas delivery interface connected to the upper airways of a user.

31 Claims, 2 Drawing Sheets

PORTABLE HOME OXYGEN THERAPY MEDICAL EQUIPMENT

The object of the present invention is to propose a portable apparatus allowing a patient to be provided with domiciliary and ambulatory oxygen therapy.

DESCRIPTION OF THE RELATED ART

Conventionally, some people suffering from respiratory insufficiencies are treated by administering gaseous oxygen so as to correct the gas contents of their blood, in particular the carbon dioxide and oxygen contents.

In some cases, the pathological state of these people requires chronic and long-term administration of gaseous oxygen, especially for patients suffering from chronic obstructive broncho-pneumopathies, the arterial oxygen pressure of whom is stabilized at values of less than 55 mm of mercury.

To do this, various methods and types of apparatus for delivering oxygen, that can be employed in the home, have been developed.

At the present time, the oxygen used for this purpose is:
  either brought to the site of use by being stored in gaseous form, for example in gas bottles of various sizes, in order to be subsequently administered to the patient;
  or brought to the site of use by being stored in liquefied form, for example in a suitable container which is connected to an evaporation system intended to vaporize the liquid oxygen so as to be able to administer it to the patient in gaseous form; such an apparatus is sold by the company Taema under the name FREELOX™;
  or produced directly on the site of use by means of a concentrator device allowing oxygen to be extracted from the air by virtue of selective nitrogen adsorption on a molecular sieve in an alternating-pressure adsorption cycle, in particular a PSA (Pressure Swing Adsorption) cycle in order to produce gaseous oxygen having a purity of approximately 90 to 95%; such an apparatus is sold by the company Taema under the name ZEFIR™.

In all cases, the oxygen is administered to the patient via a gas delivery interface capable of being connected to the upper airways of the patient, particularly nasal clips delivering gaseous oxygen to the patient continuously, i.e. during the inspiration and expiration phases, or synchronously with the breathing, i.e. during the inspiration phases only.

For effective administration of the oxygen to the patient synchronously with the patient's inspiration phases, it is possible, for example, to use a system having an "economizer" valve of the type sold by the company Taema under the name OPTIMOX™.

In general, the choice of oxygen administration apparatus must not only take account of the patient's oxygen consumption, i.e. the flow rate of oxygen consumed by the patient, and of the daily duration of the treatment, but must also allow, as far as is possible, a patient to continue to lead a normal existence, i.e. to continue walking and carrying out activities outside his home, especially professional activities, without being impeded by the said apparatus, or impeded as little as possible thereby.

Thus, the portable apparatuses preferably used at the present time are those fitted with a liquid-oxygen container connected to an evaporation system intended to vaporize the liquid oxygen before it is sent to the patient, i.e. apparatuses of the FREELOX™ type.

However, these apparatuses have the drawback of having a relatively limited autonomy, namely approximately 24 hours when they operate synchronously with the breathing, i.e. during the inspiration phases, but only a few hours continuously, i.e. during the inspiration and expiration phases.

In general, such containers have a capacity ranging from 0.5 to 2 litres of liquid oxygen, or approximately 400 to 1600 litres of gaseous oxygen.

Once the liquid-oxygen container is empty, it must be filled again from a source of liquid oxygen, such as a storage tank for example, or replaced by another full container.

It therefore follows that ambulation is, in this case, closely dependent on the supply of liquid oxygen from the container, and therefore also on the supply of liquid oxygen from the liquid-oxygen source or on the replacement of the empty container with a full container.

Moreover, systems exist which allow portable containers, such as bottles, to be filled with gaseous oxygen produced from oxygen concentrators.

Such apparatuses comprise an oxygen concentrator making it possible to take up and/or separate the oxygen from the ambient air and to then compress it in a portable container which may or may not be disconnectable from the concentrator.

However, some apparatuses do not provide the possibility of disconnecting the container from the rest of the concentrator and, in this case, the filling of the container takes place, for example, not only during the expiration phases but possibly also during the inspiration phases by diverting some of the oxygen produced by the concentrator into the filling container.

Although this type of apparatus offers an alternative for the ambulatory patient, at a lower operating cost compared with delivery from sources of oxygen in liquid form, it turns out that this type of apparatus has several drawbacks, in particular:
  it requires a greater investment than with a device having a liquid-oxygen container;
  it does not always produce enough oxygen to satisfy the patient's needs, particularly when the latter needs a lot of oxygen;
  the autonomy of the portable gaseous-oxygen container is often more limited than for a device with a liquid-oxygen container, namely a few hours at the most;
  since only a small part of the flow of oxygen produced is diverted into the oxygen container, the time taken to fill the container may prove too long, particularly when the necessary flow to the patient is approximately equal or equivalent to that produced by the concentrator, for example from 4 to 6 litres per minute; and
  compressing gaseous oxygen may entail risks, especially due to the possible presence in the stream of gaseous oxygen of droplets of grease and/or of oil coming from the compression means.

SUMMARY OF THE INVENTION

The object of the present invention is therefore to propose an improved portable apparatus for domiciliary and ambulatory oxygen therapy, which apparatus does not have the abovementioned drawbacks, as well as a process for operating such an apparatus.

In other words, the aim of the invention is to propose an apparatus which has greater autonomy and a greater output of oxygen produced and which can be used for the purpose of filling an oxygen storage container efficiently and the overall safety of which is improved.

The invention therefore relates to a portable medical apparatus for delivering an oxygen-rich gas to a user, comprising:

gas compression means for delivering air at a pressure of greater than $10^5$ Pa to gas concentrator means;

electric-current supply means for supplying electric current to at least the said gas compression means;

gas concentrator means allowing an oxygen-rich gas containing from 50 vol % to 99 vol % of oxygen to be produced from air compressed by the said gas compression means;

gas liquefaction means allowing at least some of the oxygen contained in the said oxygen-rich gas produced by the said gas concentrator means to be liquefied;

gas accumulation means allowing at least some of the oxygen liquefied by the said gas liquefaction means to be collected and stored, at least temporarily;

liquefied-gas warming/vaporizing means allowing at least some of the liquefied oxygen coming from the said gas accumulation means to be warmed and vaporized; and gas transport means allowing at least some of the oxygen produced by the said gas concentrator means and/or of the oxygen warmed and vaporized by the said warming/vaporizing means to be transported to at least one gas delivery interface capable of being connected to the upper airways of a user.

Preferably, the gas concentrator means are chosen from:

at least one gas separation chamber containing at least one bed of adsorbent and/or at least one bed of catalyst, preferably at least two gas separation chambers operating in parallel; and/or at least one membrane module, preferably at least two membrane modules arranged in series.

Depending on the case, the device according to the invention may include one or more of the following characteristics:

the electric-current supply means are an autonomous battery or the like;

the gas concentrator means are at least one gas separation chamber containing at least one bed of adsorbent containing particles of X-type or A-type zeolite exchanged with one or more metal cations, preferably lithium, calcium, potassium, sodium and/or zinc cations;

the gas concentrator means are at least one gas separation chamber, preferably two chambers arranged in parallel, operating in a PSA-type cycle, each chamber containing at least one bed of adsorbent containing particles of zeolite X exchanged to at least 80% with lithium cations;

the gas concentrator means are one or two membrane modules arranged in cascade, the permeate outlet of the first membrane module being in fluid communication with the gas accumulation means, preferably the permeate outlet of the first membrane module being furthermore in fluid communication with the gas transport means and/or the retentate inlet of the second membrane module.

the gas liquefaction means are chosen from Joule-Thomson expansion devices and/or cooling/condensing devices, especially Stirling cycle or Gifford-McMahon cycle devices.

it furthermore includes filtration means, in particular one or more filters, arranged upstream and/or downstream of the compression means.

the gas transport means comprise one or more gas lines and/or in that the gas delivery interface capable of being connected to the upper airways of a patient is chosen from respiratory clips and respiratory masks.

Moreover, the invention also relates to a process capable of being implemented by an apparatus according to the invention, comprising the steps of:

(a) compressing the air to a pressure of greater than $10^5$ Pa, preferably to a pressure of $1.1 \times 10^5$ Pa to $5 \times 10^5$ Pa;

(b) separating the air compressed in step (a) in order to produce an oxygen-rich gas containing from 50 vol % to 99 vol % of oxygen;

(c) liquefying at least some of the oxygen-rich gas;

(d) accumulating and storing, at least temporarily, at least some of the oxygen liquefied in the gas accumulation means;

(e) warming/vaporizing at least some of the liquefied oxygen coming from the said gas accumulation means; and (f) sending at least some of the oxygen warmed and vaporized in step (e) into one or more gas lines connected to a gas delivery interface.

Depending on the case, the process of the invention may include one or more of the following characteristics:

the separation of the compressed air is carried out in step (b) by adsorption or by permeation, preferably by adsorption in a PSA-type cycle using an X-type zeolite adsorbent exchanged with metal cations, preferably calcium and/or lithium cations;

the liquefaction of at least some of the oxygen-rich gas is carried out in step (c) by Joule-Thomson expansion or by cooling/condensing the oxygen;

the adsorbent in step (b) is a zeolite X exchanged to at least 70% with calcium cations or to at least 80% with lithium ions;

the oxygen is warmed in step (e) to a temperature of greater than 5° C., preferably to a temperature of 15° C. to 25° C.

DESCRIPTION OF THE PREFERRED EMBODIMENT

The invention will now be described in greater detail with reference to the appended figures, given by way of illustration but implying no limitation.

Figure 1:
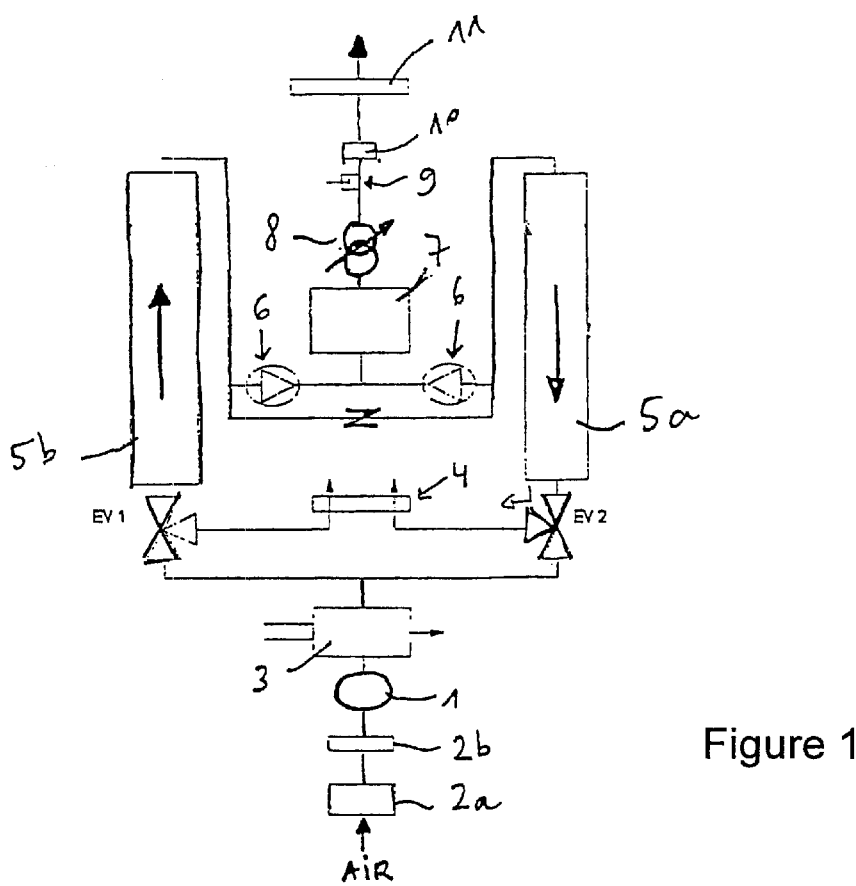
FIG. 1 shows a partial diagram of the inventive apparatus.

FIG. 1 shows a partial diagram of an apparatus according to the invention, which comprises gas compression means, namely a compressor 1, for delivering air at a pressure of greater than $10^5$ Pa, preferably at a pressure of $1.1 \times 10^5$ to $5 \times 10^5$ Pa, to gas concentrator means, namely two adsorption containers or adsorbers 5a, 5b.

The gas concentrator means 5a, 5b allow an oxygen-rich gas containing from 50 vol % to 99 vol % of oxygen, usually from 90 vol % to 95 vol % of oxygen, to be produced from air compressed by the said gas compression means 1.

More specifically, the two adsorbers 5a, 5b operate in parallel in a PSA cycle, i.e. the adsorber 5b is in the oxygen production phase while the adsorber 5a is in the regeneration phase, and vice versa.

In order to have available a higher output of oxygen produced, an X-zeolite type adsorbent, enriched to at least 80% with lithium by a conventional ion-exchange technique, is preferably used.

Such adsorbents and PSA processes are particularly described in the documents EP-A-885,646, EP-A-885, 049, EP-A-885,089, EP-A-884,088,EP-A-880,989, EP-A-884, 086 and EP-A-875,277.

This is because substituting a conventional molecular sieve with a lithium-exchanged zeolite-type sieve allows the amount of $O_2$ produced to be increased by increasing the efficiency and the productivity of the concentrator.

Thus, for a constant patient demand, more oxygen is available for subsequent liquefaction.

Preferably, the ambient air is compressed after it has been filtered by suitable filters 2a, 2b, especially a bacteriological filter 2b.

Next, the compressed and filtered air is supplied to one of the two adsorbents 5a, 5b filled with molecular sieve.

Since nitrogen is selectively adsorbed on the molecular sieve, the gas output by the adsorber 5a or 5b in the production phase is almost exclusively composed of oxygen (90–95%).

The oxygen thus produced is sent to a buffer tank 7 above a pressure threshold, which opens a valve 6.

Before the adsorbent contained in the adsorber 5a or 5b becomes saturated in the production phase, a set of solenoid valves EV1, EV2 directs the compressed air into the second adsorber 5b or 5a, which was previously in the regeneration phase and which then, in turn, goes into the production phase.

As regards the first adsorber 5b or 5a, this is then regenerated by returning to atmospheric pressure or to a subatmospheric pressure and is purged by a countercurrent flow of a portion of the oxygen flow from the other adsorber, which itself is in the production phase.

Figure 2:
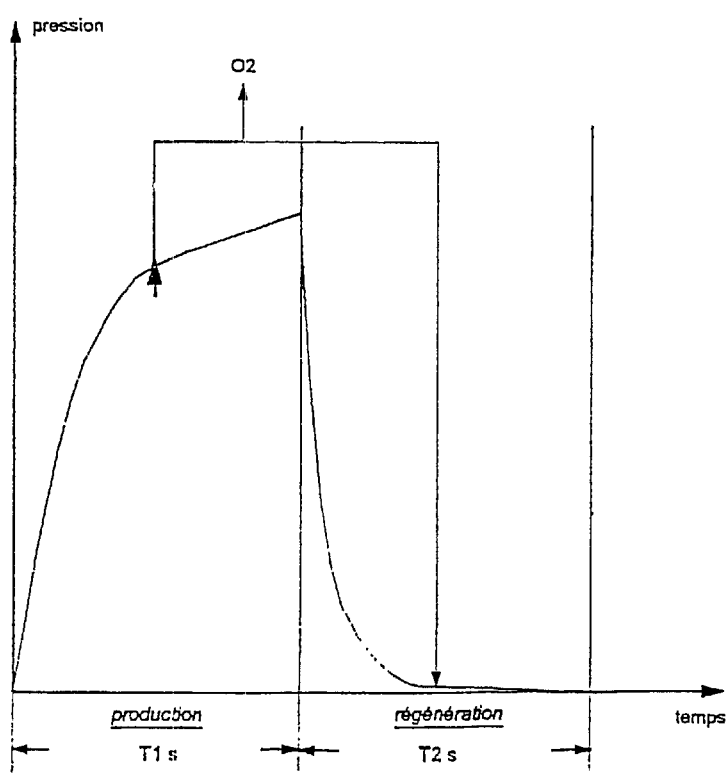
FIG. 2 shows a PSA cycle.

Such a PSA cycle is shown diagrammatically in FIG. 2, in which the profile of the pressures in each of the adsorbers 5a, 5b and the duration of the oxygen production and regeneration cycles have been shown.

Each adsorber is cyclically subjected to:
 a production phase of duration T1, during which the adsorber is pressurized by being supplied with compressed air so as to produce oxygen;
 a regeneration phase of duration T2 =T1, during which the adsorber is depressurized and then countercurrent-purged with some of the oxygen produced by the other adsorber in the production phase.

According to the invention, it is advantageous to use a lithium-enriched sieve as such sieves exhibit better adsorption characteristics than conventional sieves, for example a non-exchanged X-type zeolite.

It goes without saying that the performance of the concentrator depends especially on the air supply, especially the compressor 1, on the properties of the sieve chosen, in particular the adsorption isotherms, the geometry and particle size of the particles, etc., on the amount of sieve used, on the profile of the PSA cycle employed, on the temperature, etc.

This performance is expressed especially by the efficiency, i.e. the ratio of the amount of $O_2$ produced to the amount of $O_2$ entering, and by the productivity, i.e. the ratio of the amount of $O_2$ produced to the volume of adsorbent.

Conventionally, for an apparatus delivering 5 l/min. of 90% $O_2$, an efficiency of about 25% is obtained.

However, at $10^5$ Pa, the nitrogen adsorptivity goes from approximately 8 ml/g for a conventional 13X-type sieve to about 20 ml/g for a lithium-exchanged 13X-type zeolite sieve and, in a similar manner, the selectivity (the ratio of the nitrogen adsorptivity to the oxygen adsorptivity) goes from 3 to 6.

It therefore follows that the efficiency increases which ensure from the use of a lithium-exchanged sieve according to the invention are therefore by a factor of about 2 compared with a conventional sieve.

Such efficiency increases due to the use of a lithium-exchanged sieve allow the size of the apparatus to be reduced compared with a conventional concentrator since the amount of adsorbent used is less and a compressor with a lower output can then be used, while still producing the same amount of oxygen, both in terms of flow rate and in content.

Furthermore, by substituting the conventional sieve with an equivalent amount of lithium-exchanged sieve of comparable particle size, it is observed, firstly, that there is an increase in the produced-oxygen content if the production output is unmodified.

Secondly, if the production valve is set so as to maintain the purity at 90%, the anticipated production output will be from 8 to 9 l/min., which corresponds to an efficiency of about 45%.

Thus, by having available a greater oxygen production compared with the conventional concentrators, some of the oxygen produced and not consumed by the patient, about 2 to 6 l/ min., may be diverted downstream of the concentrator means so as to allow it to be sent to a liquefaction system.

To do this, gas liquefaction means allowing the oxygen contained in the oxygen-rich gas, produced by the concentrator means 5a, 5b and not consumed by the patient, to be liquefied.

After liquefaction, the oxygen is sent to the gas accumulation means, such as a thermally insulated filling bottle or container, allowing the oxygen liquefied by the liquefaction means to be collected and stored, at least temporarily.

The oxygen may be liquefied either by a conventional liquefaction cycle, for example a Joule-Thomson expansion with or without an expansion machine, or by cooling and condensing on a surface cooled by a cryocooler, for example a Stirling cycle machine, a Gifford-McMahon cycle machine or a pulse-tube machine.

However, it should be emphasized that condensation liquefaction is preferred as it allows the risks associated with the compression of gaseous oxygen to be avoided.

The liquid oxygen formed is stored in a liquid container, such as the ambulation container.

Figure 3:
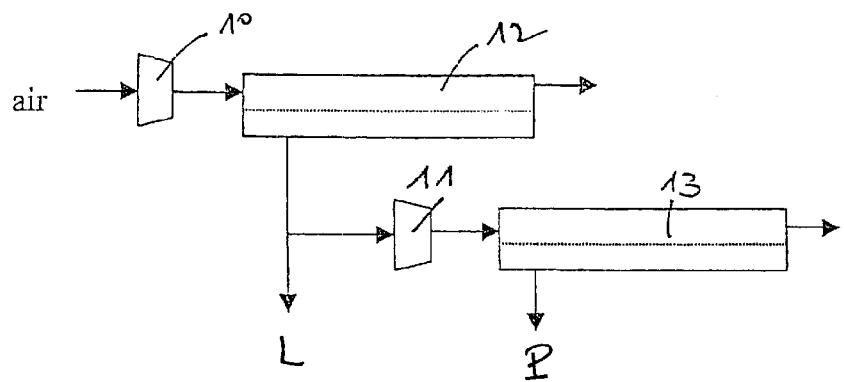
FIG. 3 shows two permeation modules.
Figure 4:
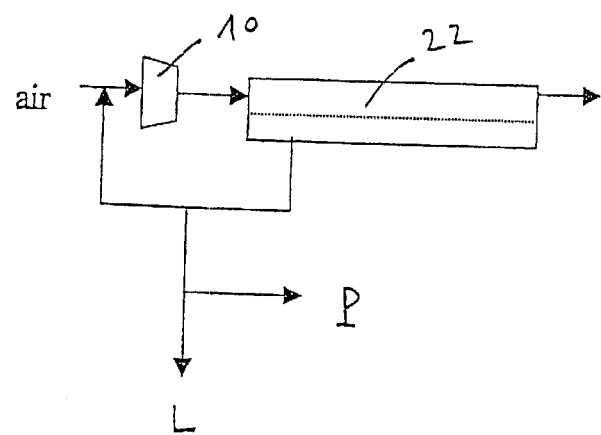
FIG. 4 shows a single permeation module.

As a variant, in order to have even more gas for filling the ambulation system, one embodiment of the invention consists in replacing the adsorber or adsorbers 5a, 5b with one or more membrane modules, such as those shown diagrammatically in FIGS. 3 and 4.

In the case with two modules 12, 13 in FIG. 3, the first module 12 is supplied with compressed air (at 10) and the second module 13 is fed, after recompression at 11, with a portion of the oxygen-enriched permeate output by the previous module 12.

The permeate oxygen output by the second module 13, having a purity of at least 85%, is sent to the patient P for the purpose of oxygen therapy, while the complement of the permeate output not supplied to the second module 13 is directed into the liquefaction unit L.

During the condensation liquefaction phase L, the process is controlled so as to preferably condense the oxygen and to remove the residual nitrogen in order to enrich the liquid intended for filling the container.

An embodiment having a single permeation module 22 is shown in FIG. 4.

In this case, a portion of the permeate oxygen flow output by the module 22 is recompressed by the compressor 10 by mixing it with the incoming air, that is to say a portion of the oxygen produced is recycled, the other portion of the permeate flow being sent, on the one hand, to the patient P, and on the other hand, to the liquefaction system L.

Moreover, the apparatus also includes gas warming/vaporizing means allowing the liquefied oxygen coming from the gas accumulation means, i.e. the ambulation container, to be warmed and vaporized, as required.

Gas transport means, such as gas lines, allow the oxygen produced by the concentrator means and/or the oxygen warmed and vaporized by the warming/vaporizing means to be transported to a gas delivery interface, for example respiratory clips, capable of being connected to the upper airways of the patient.

Figure 5:
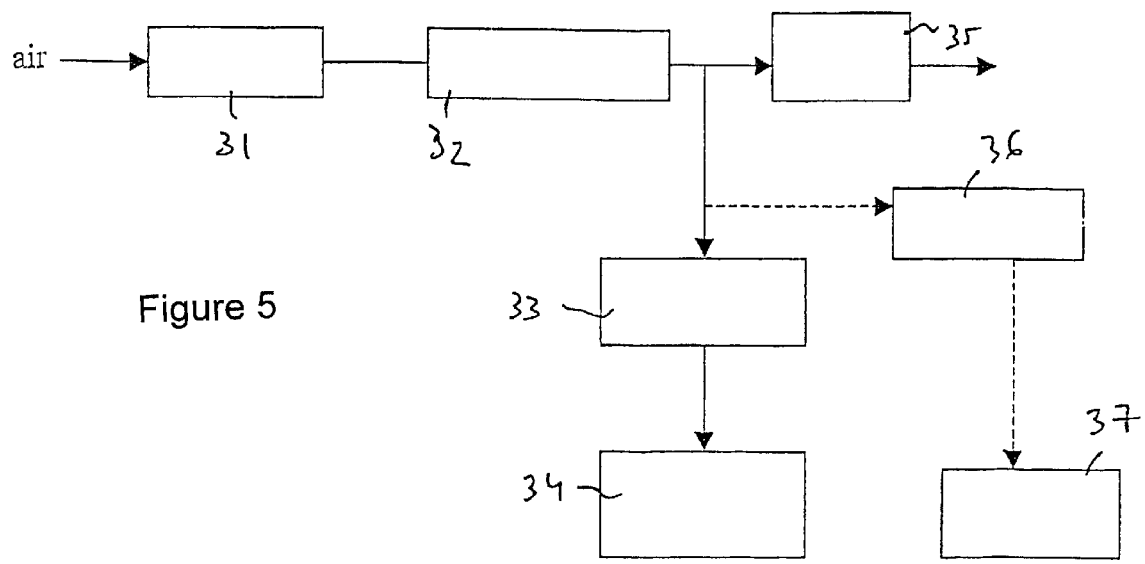
FIG. 5 shows an overall diagram of the inventive apparatus.

Moreover, FIG. 5 shows a diagram of the overall arrangement of an apparatus according to the invention.

More specifically, atmospheric air is compressed (at 31) to a pressure ranging generally from $1.1 \times 10^5$ Pa to $5 \times 10^5$ Pa, the air being preferably filtered before and after compression.

After compression, the air is separated (at 32) in order to produce an oxygen-rich gas containing from 50 vol % to 99 vol % of oxygen, generally from 85 vol % to 95 vol % of oxygen. This is carried out as described above and shown diagrammatically in FIGS. 1, 3 or 4.

Next, this oxygen-rich gas flow may be sent directly to the patient P, it being optionally stored temporarily beforehand in a buffer tank (at 35) or the like.

However, when the oxygen demand of the patient P is low and/or when the amount of oxygen-rich gas flow produced is greater than the needs of the patient P, a variable portion of the oxygen-rich gas is liquefied (at 33), as described above, and then stored in an ambulation container (at 34) for the purpose of being used later by the patient P, after having been previously vaporized and optionally warmed to a temperature of greater than 5° C. by warming/vaporizing means (not shown), preferably to at least 18° C.

At least a portion of the warmed and vaporized oxygen is sent to the patient P conventionally via one or more gas lines connected to a gas delivery interface, such as a respiratory mask.

Optionally, a portion of the gaseous oxygen produced by the concentrator means (at 32) may furthermore be also recompressed (at 36) and then stored in a portable gaseous-oxygen container (at 37), without being liquefied.

In general, the apparatus according to the invention therefore offers the possibility of liquefying all or some of the oxygen production output by a concentrator so as to fill a portable liquid container, allowing ambulation by the patient and providing him with markedly greater autonomy than a conventional portable bottle.

The apparatus according to the invention is particularly suitable for the medical field, but it may also be used in the sporting field, for example to provide an oxygen top-up to an athlete after physical exertion.

What is claimed is:

1. Portable medical apparatus for delivering an oxygen-rich gas to a user, comprising:
    gas compression means for delivering air at a pressure of greater than $10^5$ Pa to gas concentrator means;
    electric-current supply means for supplying electric current to at least said gas compression means;
    gas concentrator means allowing an oxygen-rich gas containing from 50 vol % to 99 vol % of oxygen to be produced from air compressed by said gas compression means;
    gas liquefaction means allowing at least some of the oxygen contained in said oxygen-rich gas produced by said gas concentrator means to be liquefied;
    gas accumulation means allowing at least some of the oxygen liquefied by said gas liquefaction means to be collected and stored, at least temporarily;
    liquefied-gas warming and vaporizing means allowing at least some of the liquefied oxygen coming from said gas accumulation means to be warmed and vaporized; and
    gas transport means allowing at least some of the oxygen from at least one of said gas concentrator means and said warming and vaporizing means to be transported to at least one gas delivery interface capable of being connected to the upper airways of a user.

2. Apparatus according to claim 1, characterized in that the gas concentrator means are chosen from:
    at least one gas separation chamber containing at least one bed of adsorbent and at least one bed of catalyst; and
    at least one membrane module.

3. Apparatus according to claim 1, characterized in that the gas concentrator means are at least one gas separation chamber containing at least one bed of adsorbent containing particles of X-type or A-type zeolite exchanged with one or more metal cations.

4. Apparatus according to claim 1, characterized in that the gas concentrator means are at least one gas separation chamber, each chamber containing at least one bed of adsorbent containing particles of zeolite X exchanged to at least 80% with lithium cations.

5. Apparatus according to claim 1, characterized in that the gas concentrator means include two membrane modules arranged in cascade, a permeate outlet of the first membrane module being in fluid communication with the gas accumulation means.

6. Apparatus according to claim 1, characterized in that the gas liquefaction means are chosen from Joule-Thomson expansion devices, Stirling cycle devices, and Gifford-McMahon cycle devices.

7. Apparatus according to claim 1, further comprising filtration means arranged upstream or downstream of the compression means.

8. Apparatus according to claim 1, characterized in that the gas transport means comprise one or more gas lines and in that the gas delivery interface capable of being connected to the upper airways of a patient is chosen from respiratory clips and respiratory masks.

9. Process implemented by an apparatus according to claim 1, comprising the steps of:
    (a) compressing the air to a pressure of greater than $10^5$ Pa;
    (b) separating the air compressed in step (a) in order to produce an oxygen-rich gas containing from 50 vol % to 99 vol. % of oxygen;
    (c) liquefying at least some of the oxygen-rich gas;
    (d) accumulating and storing, at least temporarily, at least some of the oxygen liquefied in the gas accumulation means;
    (e) warming and vaporizing at least some of the liquefied oxygen coming from the said gas accumulation means; and (f) sending at least some of the oxygen warmed and vaporized in step (e) into one or more gas lines connected to a gas delivery interface.

10. Process according to claim 9, characterized in that the separation of the compressed air is carried out in step (b) by adsorption or by permeation.

11. Process according to claim 9, characterized in that the liquefaction of at least some of the oxygen-rich gas is carried out in step (c) by one of Joule-Thomson expansion and cooling-condensing the oxygen.

12. Process according to claim 9, characterized in that the adsorbent used in step (b) is a zeolite X exchanged with one of at least 70% calcium cations and at least 80% lithium ions.

13. Process according to claim 9, characterized in that the oxygen is warmed in step (e) to a temperature of greater than 5° C.

14. Medical apparatus for producing and liquefying oxygen-rich gas, comprising:

gas compression means for delivering air at a pressure of greater than $10^5$ Pa to gas concentrator means;

gas concentrator means allowing an oxygen-rich gas containing from 50 vol % to 99 vol % of oxygen to be produced from air compressed by the said gas compression means;

gas liquefaction means allowing at least some of the oxygen contained in the said oxygen-rich gas produced by the said gas concentrator means to be liquefied; and gas accumulation means allowing at least some of the oxygen liquefied by the said gas liquefaction means to be collected and stored, at least temporarily.

15. Apparatus according to claim 14, wherein the gas concentrator means are chosen from:

at least one gas separation chamber containing at least one of a bed adsorbent and a bed of catalyst; and at least one membrane module.

16. Apparatus according to claim 14, wherein the gas concentrator means are at least one gas separation chamber containing at least one bed of adsorbent containing particles of X-type or A-type zeolite exchanged with one or more metal cations.

17. Apparatus according to claim 14, wherein the gas concentrator means are at least one gas separation chamber, each chamber containing at least one bed of adsorbent containing particles of zeolite X exchanged to at least 80% with lithium cations.

18. Apparatus according to claim 14, wherein the gas concentrator means are membrane modules arranged in cascade, a permeate outlet of the first membrane module being in fluid communication with the gas accumulation means, a permeate outlet of the first membrane module being furthermore in fluid communication with at least one of the gas transport means and a retentate inlet of the second membrane module.

19. Apparatus according to claim 14, wherein the gas liquefaction means are chosen from Joule-Thomson expansion devices and cooling-condensing devices.

20. Apparatus according to claim 14, further comprising filtration means having one or more filters arranged in fluid communication with the compression means.

21. Apparatus according to claim 14, wherein the gas transport means comprise one or more gas lines.

22. Apparatus according to claim 14, further comprising electric-current supply means for supplying electric current to at least said gas compression means.

23. Process implemented by an apparatus according to claim 14, comprising the steps of:

(a) compressing the air to a pressure of greater than $10^5$ Pa;

(b) separating the air compressed in step (a) in order to produce an oxygen-rich gas containing from 50 vol % to 99 vol % of oxygen;

(c) liquefying at least some of the oxygen-rich gas; and (d) accumulating and storing, at least temporarily, at least some of the oxygen liquefied in the gas accumulation means.

24. Process according to claim 23, wherein the separation of the compressed air is carried out in step (b) by adsorption using an X-type zeolite adsorbent exchanged with metal cations.

25. Process according to claim 23, wherein the liquefaction of at least some of the oxygen-rich gas is carried out in step (c) by one of Joule-Thomson expansion and cooling-condensing the oxygen.

26. Process according to claim 23, wherein the adsorbent in step (b) is a zeolite X exchanged with one of at least 70% calcium cations and at least 80% lithium ions.

27. Process according to claim 23, wherein the oxygen is warmed in step (e) to a temperature of 15° C. to 25° C.

28. Process according to claim 23, comprising the step of:

(e) warming and vaporizing at least some of the liquefied oxygen coming from the said gas accumulation means.

29. Process according to claim 28, comprising the step of:

(f) sending at least some of the oxygen warmed and vaporized in step (e) into at least one gas line connected to a gas delivery interface.

30. Medical device according to claim 14, further comprising:

liquefied-gas warming and vaporizing means allowing at least some of the liquefied oxygen coming from the said gas accumulation means to be warmed and vaporized.

31. Medical device according to claim 14, further comprising:

gas transport means allowing at least some of the oxygen produced by the said gas concentrator means and of the oxygen warmed and vaporized by said warming and vaporizing means to be transported to at least one gas delivery interface.

* * * * *